United States Patent [19]

Smith et al.

[11] 4,210,906
[45] Jul. 1, 1980

[54] TRANSIENT SUPPRESSION AND DETECTION SYSTEM WITH OPERATIONAL INDICATOR MEANS

[76] Inventors: Jennings T. Smith, 2929 W. 11400 South; George L. LeBaron, 3068 W. 10755 South, both of South Jordan, Utah 84065

[21] Appl. No.: 961,859

[22] Filed: Nov. 20, 1978

[51] Int. Cl.² .............................................. H02H 3/22
[52] U.S. Cl. ................................. 340/659; 340/661; 361/91; 361/111
[58] Field of Search .............. 340/659, 660, 662, 661; 324/102; 307/237; 361/88, 91, 111, 117, 118, 119; 179/1 N

[56] References Cited

U.S. PATENT DOCUMENTS

| | | | |
|---|---|---|---|
| 3,793,535 | 2/1974 | Chowdhuri | 361/118 |
| 3,836,854 | 9/1974 | Wehman | 340/661 |
| 3,911,360 | 10/1975 | Kimzey | 340/661 |
| 3,987,393 | 10/1976 | Knauer | 324/102 |
| 4,023,071 | 5/1977 | Fussell | 361/111 |
| 4,095,163 | 6/1978 | Montague | 361/111 |
| 4,127,888 | 11/1978 | Epstein | 361/111 |
| 4,152,656 | 5/1979 | Udvardi-Lakos | 340/661 |

*Primary Examiner*—Gerald L. Brigance
*Attorney, Agent, or Firm*—M. Ralph Shaffer

[57] ABSTRACT

A system for providing the suppression of voltage transients and other electromagnetic interference with positive indication of the operational status of the system. More particularly, a transient suppression circuit is utilized that suppresses and dissipates electromagnetic interference and transient energies that might be present; furthermore, there are detection and indicator circuits provided indicating to the user (1) whether or not each circuit is operative and functioning as it should, and (2) whether indeed transients are present in the system. A central concept of the system provides for transient detection and suppression capability, that detects transient activity occurring at voltage levels greater than the suppression threshhold established by the transient suppression circuit. The system or device can be used as an insertion device directly in the line, or can be disposed in shunt across the power lines.

14 Claims, 10 Drawing Figures

FIG.1 BLOCK DIA.   FIG. IA

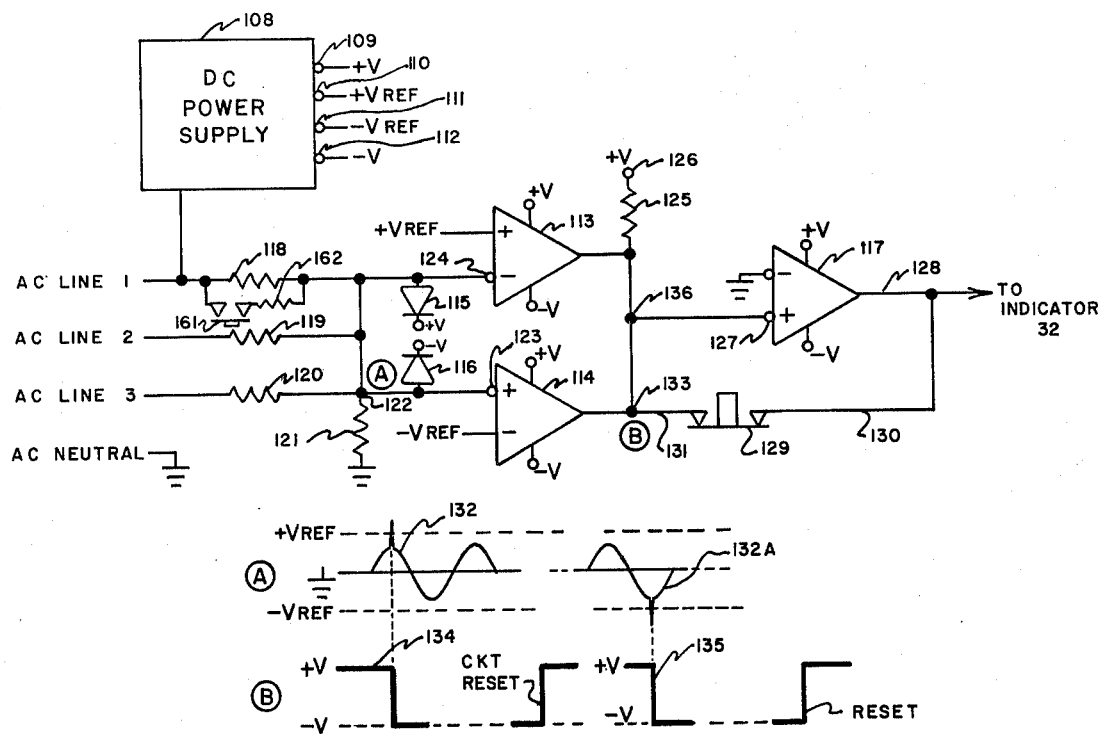
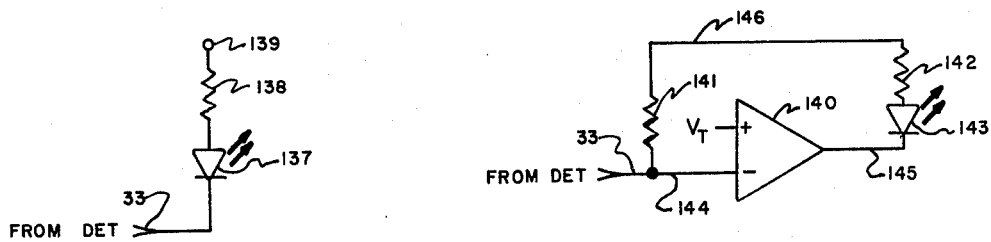
FIG. 5
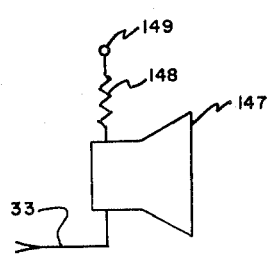
FIG. 6A
FIG. 6B
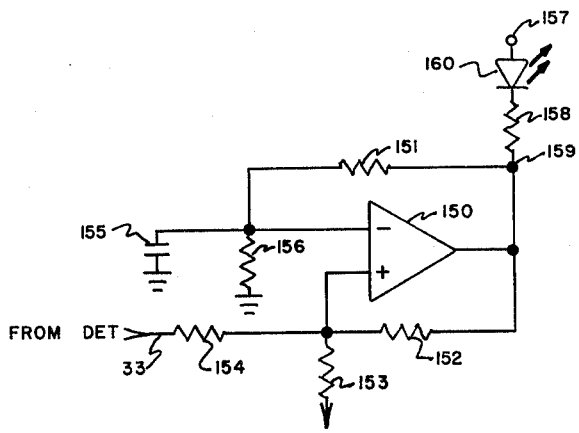
FIG. 6C
FIG. 6D

TRANSIENT SUPPRESSION AND DETECTION SYSTEM WITH OPERATIONAL INDICATOR MEANS

FIELD OF INVENTION

The present invention relates to transient and noise suppression and indication systems and circuits and, more particularly, provides a system, whereby in-line or disposed in shunt with incoming lines, which detects transients including electromagnetic interference, and noise, as well as dissipates energies therefrom, and includes circuit means for indicating the operation or non-operation of the suppression circuitry employed as well as the operational characteristics of the detection and indicator circuits employed with the suppression circuit of the system. Means are provided for simulating transient presence so as to enable the user to check out the latter part of the system as to the indicator and detection circuits used.

DESCRIPTION OF PRIOR ART

In the past, certain work has been done in connection with transient analysis, inter alia, as may be seen from the following U.S. Pat. Nos:

| | | |
|---|---|---|
| 3,573,614 | 3,999,124 | 3,815,088 |
| 3,818,667 | 4,058,804 | 3,882,378 |
| 3,987,393 | 3,795,861 | 4,016,552 |

U.S. Pat. Nos. 3,813,667 and 3,987,393 are voltage analyzers measuring over voltages, under voltages, frequency shifts, etc. These circuits do not envision employment thereof with transient suppression circuits. Such circuits, when are simply tools for analyzing the characteristics of input power. These devices neither suppress or dissipate energy as in the present invention. Furthermore, there is no transient simulation present in these systems, nor is there detection means given to indicate as to whether or not the circuits are fully operative, either in the presence or the absence of transients. U.S. Pat. No. 3,987,393 is dissimilar to the immediately above-mentioned United States Patent, in that the '393 patent envisions equipment disconnection in response to marked variation in line voltage, a factor having nothing whatever in relation to the present invention.

The following patents are still less pertinent to the invention described and claimed herein than the two previously mentioned patents, as follows:

| | | |
|---|---|---|
| 3,573,614 | 3,999,124 | 3,815,088 |
| 3,882,378 | 3,795,861 | 4,058,804 |

In this latter group of patents there are respective mechanisms for detecting changing voltage levels, but the result is employed for uses and operations totally dissimilar to those of the present invention.

A final patent, U.S. Pat. No. 4,016,552, constitutes of itself a third category, which does use a comparator that compares a reference voltage to the voltage of a signal source. However, the comparator here stretches the pulse, by virtue of the capacitor shunting the comparator; further, contra the present invention: there is no built-in memory of the event, positive and negative pulses are detected with the same circuit, and the threshold itself is variable. The circuit is also not used for detecting transients on alternating current lines. In reality, the circuit of this '552 patent is simply a pulse detector employed with computer or test-equipment logic for detecting high-speed input pulses relative to a variable threshhold. This is totally dissimilar art to that which with the present invention is concerned.

BRIEF DESCRIPTION OF THE INVENTION

According to the present invention, a system is provided for a number of purposes including the protection and improvement of operation of many types of loads, be the same industrial loads including a number of induction motors, business establishments employing a great deal of fluorescent lighting and refrigeration equipment, common house-wiring loads, and other industrial uses. In background, it is noted that there are many types of electrical loads, simple or complex, which, as a result of reflected impedances, intermittent operation of equipment, induction devices, and so on, there may exist, even independently of the character of input line voltage, a vast array of electromagnetic, electromechanical, or other interferences giving rise to noise, transients, and other irregularities to nominal, input voltages to standing equipment. Furthermore, there may exist transients as to line-voltages themselves, e.g., weather disturbances. In any case, the transients and noise need to be detected and suppressed and their energies dissipated so that the input electrical power to several types of equipment and lighting, for example, can be "cleaned up." In the absence of "clean," sinusoidal wave-form voltages being present for use by industrial equipment, many types of equipment such as lighting, motors, and so forth, may be seriously damaged or at least operate in undesired ranges of inefficiency, in the presence of transients and/or noise. In sum, therefore, the present invention provides transient suppression, detection and indicator circuits, which will operate to suppress said transients and noise, will protect the circuits themselves and will detect extreme transient impulses and also noise in the event the suppressed circuits become damaged. For sake of convenience herein "transient" shall include not only transient spikes or impulses but also high-frequency static discharges and/or "noise" that is to be filtered out or otherwise dissipated.

To resume, the transient suppression circuit herein is related to ancillary means in a form of a detection circuit and an indicator circuit, to indicate that the suppression circuit is in fact operating as it should or, alternately, indicates that the circuit is not operating correctly. The suppression circuit itself is designed to dissipate the energies of the transients, impulses including noise, that are present at this point. The detection circuit and indicator circuit, as hereinafter described, and which follow the suppression circuit, act conjointly to provide positive, fail-safe information to indicate whether or not there yet exists transients in the overall system and also whether or not the entire system and its components are operative. Adequate push button switches, re-set switches, and so forth, are provided for a variety of test functions, to ensure that the over-all system is fully operative for the purposes intended.

OBJECTS

Accordingly, a principal object of the present invention is to provide a new and improved means for protecting electrical and/or electromechanical equipment.

A further object is to provide a system for suppressing irregularities in desired wave forms, these such irregularities, impulses or noise, hereinafter conjointly referred to simply as "transients".

A further object is to provide a combination suppression circuit, detection circuit and indicator circuit in a transient reduction system whereby means are provided for ensuring that various components or circuits within the system are fully operative, whether or not transients are present.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is block diagram of a representative system in a preferred form of the invention; for plural-phase or poly-phase systems the lower legs, shown partly in dotted-line configuration, indicate the system addition over and above the basic single-phase unit at the upper third of the figure.

FIG. 1A illustrates how, in a common, house-wiring circuit, for example, split halves from a transformer winding may employ separate suppression circuits to comprise an overall, split half, single-phase system.

in FIG. 3, the transient detection circuits work on the positive side of the cycle and therefore can be referred to for convenience as a positive transient-detection circuit.

FIG. 5 is another alternate schematic, alternate to that shown in FIG. 3 or FIG. 4, indicating a bi-polar transient detector circuit which operates through both the positive half and negative half of the input voltage cycle.

FIGS. 6A–6D are circuit diagrams in fragmentary form, indicating one of several indicator circuits or stages that can be employed to either audibly or visually indicate certain circuit conditions to the user, and in certain instances, whether he is actively actuating the system to test the same or not.

DETAILED DESCRIPTION OF PREFERRED EMBODIMENTS

Figure 2:
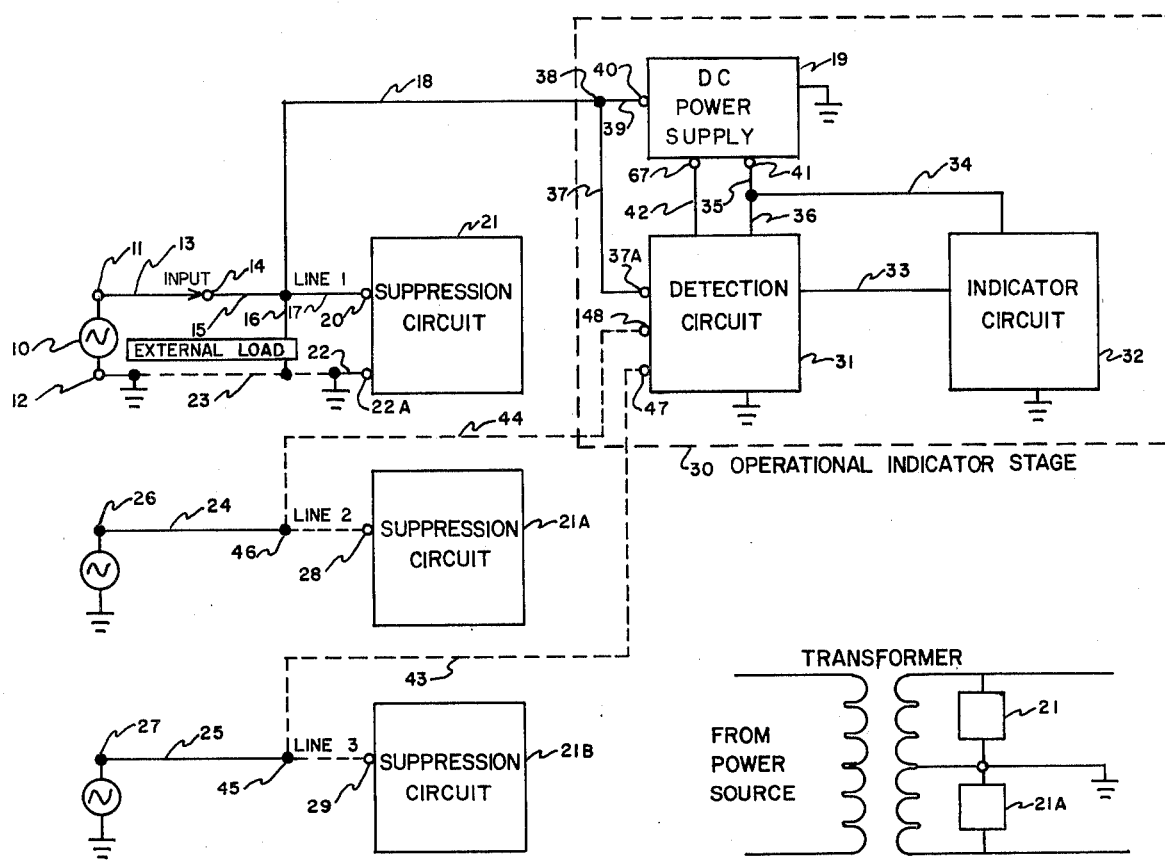
FIG. 2 illustrates in schematic form a suppression circuit useable in the suppression circuit block diagram of FIG. 1; for plural or poly-phase systems, additional suppression circuits found at the lower two-thirds of FIG. 2 are shown.

In FIG. 1 alternating current source 10 includes a pair of terminals 11 and 12, the latter of which is maintained at a ground or a common reference potential. Lead 13 is connected to terminal 11 and also system input terminal 14. The external load to be supplied power is coupled between terminal 14 and the common reference potential. Lead 15 is coupled between input terminal 14 and junction 16. To junction 16 is coupled line 17, termed "line 1" in the drawings, and also lead 18 leading to direct current power supply 19. Input terminal 20 of transient suppression circuit 21 is coupled by lead 17 to junction 16. Ground reference 22 comprises another input relative to transient suppression circuit 21 and is maintained at a common reference potential either through a chasis, or a common reference potential lead 23, shown for convenience of illustration by dotted line 23. Terminal 22A will be coupled to lead 22. It will be understood that lead 23 and the ground indications given in FIG. 1 symbolize electrical ground or other common reference voltage.

As thus far described, a single phase system has been accommodated.

Where there is a multiple phase system, such as a unitary or split two-phase system or, more particularly, a three-phase system, wye or delta, leads 24 and 25 coming from respective A.C. power connections 26 and 27 will lead to input terminals 28 and 29 of additional suppression circuits 21A and 21B. It will be understood that suppression circuits 21A and 21B will be substantially or even exactly the same as suppression circuit 21 at the top of the figure.

In connction of plural phase system, lead 23 will be a common ground and will be the forth wire for three-phase wye or delta systems, for example.

Rectangular block 30 in FIG. 1 comprises the operational indicator stage which includes, in addition to direct current power supply 19 a transient detection circuit 31 and also a transient indicator circuit 32. These are coupled together by leads 33, 34, 35, 36 and 37, all as indicated in FIG. 1, lead 37 being coupled to to terminal 37A and also to junction 38 leading via lead 39 to the direct current power supply 19. Terminal 40 comprises the alternating current input terminal 40. It is to be noted that the direct current power supply 19 has an alternating-current input but a direct current positive voltage output at terminals 41 and 67. Direct current output lead 42 will always be coupled between direct current power supply 19 and transient detection circuit 31; and, depending upon the circuitry involved for the transient indicator circuit, the second direct current lead at 42 may or may not be coupled to the same. This will be explained hereinafter.

It will also be understood hereinafter that the simple detection circuit block at 31 in FIG. 1 may be replaced by a more complex transient detector circuit in which event four leads will be required from direct current power supply 19. Leads 43 and 44 will be coupled from junctions 45 and 46 to terminals 47 and 48, respectively, in the event that plural phase systems are employed. Leads 18, 44 and 43 simply monitor the wave forms at junctions 16, 45 and 46 to determine if transient spikes are present thereat. Grounds may likewise be supplied the transient detection circuit 31 and the transient indicator circuit 32 as shown.

FIG. 2 illustrates the suppression circuits, the uppermost portion of the figure being transient suppression circuit 21 which is employed in a single phase system, and identical suppression circuits relative to stages 21A and 21B in FIG. 1 where a multiple phase system is employed. For convenience of illustration, and since the operation will be the same for all three stages (21, 21A and 21B), only the uppermost circuit will be described. Lead 17A is a lead common with an extension of lead 17 of FIG. 1. Correspondingly, the common reference voltage line 23 is continued on by lead 23A in FIG. 2. Disposed between leads 17A and 23A are three circuits disposed in parallel. The middle circuit simply comprises a capacitor 47 which may, for example be of the order of 0.047 microfarads. The purpose of the capacitor, and being of relatively small impedance is to short high frequency "noise" of the incoming signal to ground.

Another leg includes inductor 48 disposed in series with varistor 49, these two being connected in series together. The inductor may simply be an air core or even a small iron core choke, by way of example; in any event, the purpose of the inductor is to prevent damage to the varistor which might otherwise result owing to excessively high input transients.

Varistors are manufactured by several companies, including the General Electric Company, by way of example, and these come with a variety of set parameters, depending on what is required. In any event, the varistor will be chosen such that upper and lower voltage levels or limits can be established to clamp the input signal and to short out transients, both positive and negative, that exceed such limits or clamping levels. It is to be noted that the varistor is designed of course to adsorb and dissipate energy of voltage transients, however, if such voltage transients become severe, especially over a protracted period, then the clamping levels may be widened. In such event, therefore, and as a necessary precaution, it is wise to include some type of inductor, or possibly a resistor though not so effectively, in precluding successive voltage drops and consequent damage to the varistor when high voltage spikes are experienced.

The third leg is composed of an indicator light 50 that is disposed in series with current limiting resistor 51 and normally open spring-loaded push button switch 52. At this point it should be mentioned that some indicator lights will have sufficient internal resistance to preclude damage to the light even though excessive voltage spikes may be experienced as between leads 17 and 23. In many case, however, a separate current limiting resistor at 51 will be employed simply to drop the voltage down to the rated value of the light.

It should be noted that the push button switch 52, which is spring-loaded, is an optional feature and may be replaced simply by a shunt wire 53 or otherwise coupled directly from the light to lead 17A. The inclusion of push button switch 52 is simply for the convenience of the operator where he wishes to extend the life of the light bulb by simply intermittently and periodically closing the switch to verify that the suppression circuit is connected to the power lines.

Circuits 21A and 21B operate in identical fashion to circuit 21 and hence will not be separately described. Again, circuits 21A and 21B will be used only for plural phase systems, as to example wye or delta three phase systems.

It will be understood, of course, that while homes will have single phase power systems, one leg of a three-phase transformer will be tapped so that in effect there are two single phase inputs with some of the outlets and service being coupled across one-half of the tapped leg of the transformer and other service tapped across the other half. In such cases, of course, there will be a suppression circuit supplied for each of the two halves, i.e., of a split single phase system. The above concept is illustrated briefly and generically in connection with FIG. 1A. Other types of single and plural phase systems are, of course, possible, and the hook-up will take the same general form shown as in FIG. 1.

Figure 3:
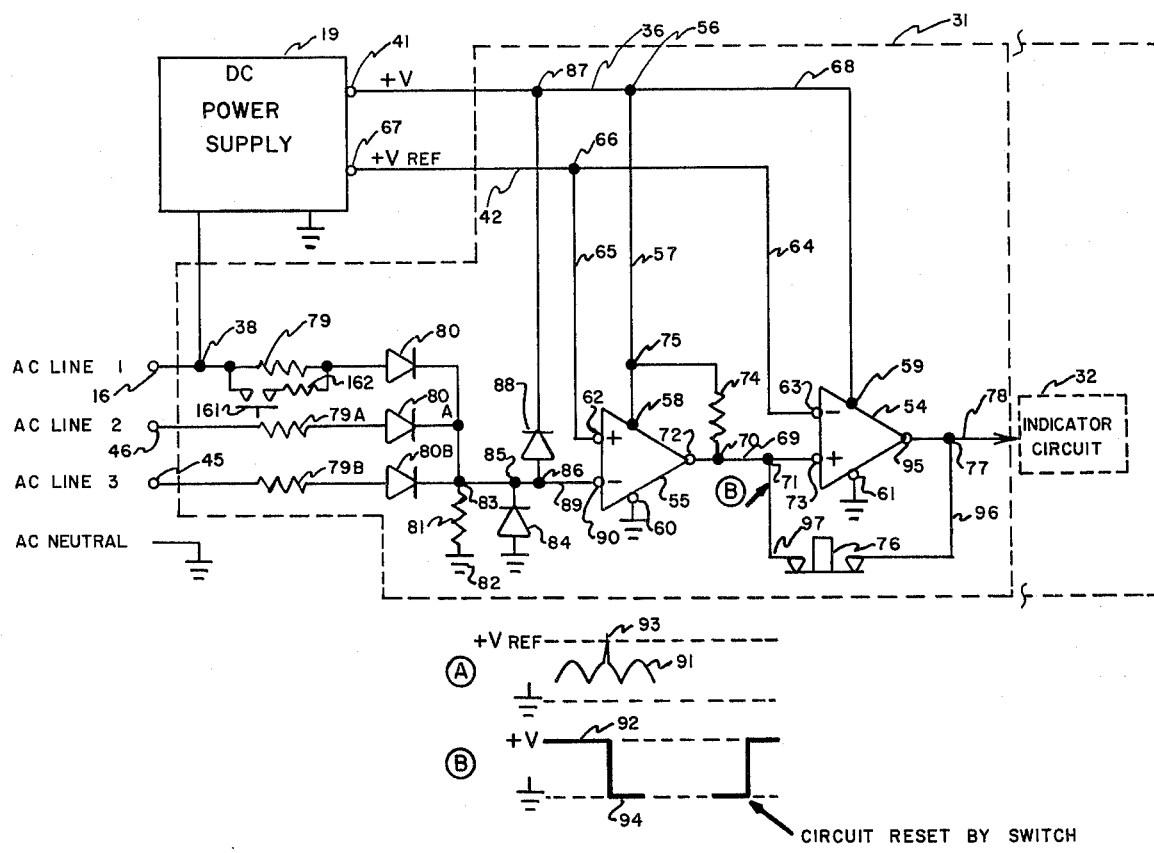
FIG. 3 illustrates a representative transient detection circuit that can be employed in the detection circuit stage of FIG. 1.

In FIG. 3 transient detection circuit 31 is illustrated, the same employing voltage comparators 54 and 55. The comparators shown may be two-forths of an integrated circuit such as integrated circuit chip LM339 manufactured by National Semiconductor Corporation. Direct current power is supplied across the voltage comparators from junction 56, by leads 57 and 68, at terminals 58 and 59, the opposite terminals 60 and 61 being grounded. Voltage reference terminals 62 and 63 are terminals coupled by leads 64 and 65 to junction 66, the latter being connected to the voltage reference terminal 67 by lead 42. Lead 68 is coupled between junction 56 and voltage terminal 59. Lead 69 is coupled to junctions 70 and 71 as noted and comes from the output of comparator 55 at 72 to input terminal 73 of voltage comparator 54. Resistor 74 is coupled between junctions 75 and 70 as indicated. Re-set switch 76 is coupled across junctions 77 and 71 and comprises a normally closed spring loaded push button switch. Lead 78 connects to the indicator circuit 32 of FIG. 1. A series circuit is noted as to resistor 79 and diode 80 that are coupled in series and through common load resistor 81 to ground at 82. Where plural phases or split single phases are incorporated, then resistors 79A and 79B will be employed and will be coupled in series with their respective diodes 80A and 80B, meeting at common junction 83 as shown. Diode 84 is coupled between ground and junction 85. Correspondingly, junction 86 is coupled to junction 87 via diode 88. Lead 89 intercouples junction 86 with voltage terminal 90 of comparator 55.

In operation, and by way of example, power supply output terminal 41 will be maintained at +12 volts and reference voltage terminal 67 will be maintained at +6 volts. Again, the power supply comprise a direct current power supply at 19 of any common variety. Thus, in operation, the reference voltage, i.e., +6 volts, appears at terminal 62 of comparator 55 and also terminal 63 of comparator 54. The resistance and diode circuits at the lower left of the drawing comprise a wired OR circuit wherein the system will detect a transient occurring at any of the terminals 16, 46 and 45 which when passing through a respective parallel circuit will appear across resistor 81. In effect, resistors 79 and 81, comprise a voltage divider wherein a fraction of the input voltage, that is the nominal voltage plus transient, will appear at junction 83 and will be reflected at terminal 90 to be compared with the reference voltage at terminal 62. The resistance values in the voltage divider at 79 and 81, for example, will be selected in accordance with the nominal line voltage, the parameters of the comparators being used, and the threshhold at which to detect the transients. The diodes included at 80 and 80A and 80B simply limit current passage to include only one-half of the wave form and thereby serve as rectifiers. Thus, there appears at terminal 90 rectified alternating voltages from the combined phases, which is illustrated at wave form 91. This wave form occurring at terminal 90 is compared with the reference voltage coming at line 65.

The system is set and circuit parameters are chosen such that, in the absence of transient voltage spikes existing, the voltage at terminal 90 will be less than the reference voltage at 62, in which event a "high" voltage output at 72 occurs at wave form 92. In the event, however, that a positive transient spike appears as shown at 93, then terminal 90 is driven instantaneously more positive than terminal 62 in which event the output voltage at 72 will be lower as at level 94. This voltage level will be at or near ground potential.

Resistor 74 is a high value resistor, possibly 10K so that the high voltage at 92 is maintained in the absence of transients.

The output from terminal 72 is fed to terminal 73 of the second comparator 54. This voltage is compared with the reference voltage at 63.

As to the operation of comparator 54, in the absence of transients, terminal 73 will be more positive than terminal 63 in which event, terminal 95 is also maintained at a high voltage level, being connected through the re-set switch 76 back to junction 71. When a transient occurs at terminal 90, however, a low positive voltage is impressed at terminal 73, lower than the potential at terminal 63, in which event the voltage at 77 drops essentially to ground. Once this low voltage condition is present at 96 and 97, then the comparator 54 maintains the voltage potential at 73, thus maintaining terminal 73 at a low potential so that in effect, the comparator 54 serves as a memory. Since there is a low voltage 78 to indicator 32, the indicator will respond in accordance with such voltage presence or lack thereof at terminal 95.

In any event, when the re-set switch 76 is actuated so as to temporarily open the circuit shunting across junctions 95 and 73, then the low voltage at 95 is removed from 71 so that the high voltage condition will return to junction 73. This functions to re-set the memory function of comparator 54.

Diodes 84 and 88 are in place in the circuit as shown so that these will limit the voltage excursions from transients impressed at terminal 90 so as to protect the comparator 55 from applications of excessive voltage on input terminal 90 and consequent damage.

It is noted that FIG. 3 is based upon the premise that, while FIG. 3 only utilizes positive transients occurring on the positive side of the wave form, still all transients will be suppressed in the suppressor circuit, both positive and negative; if any transients get through, some will be of a positive character which can be detected in the circuit of FIG. 3.

Figure 4:
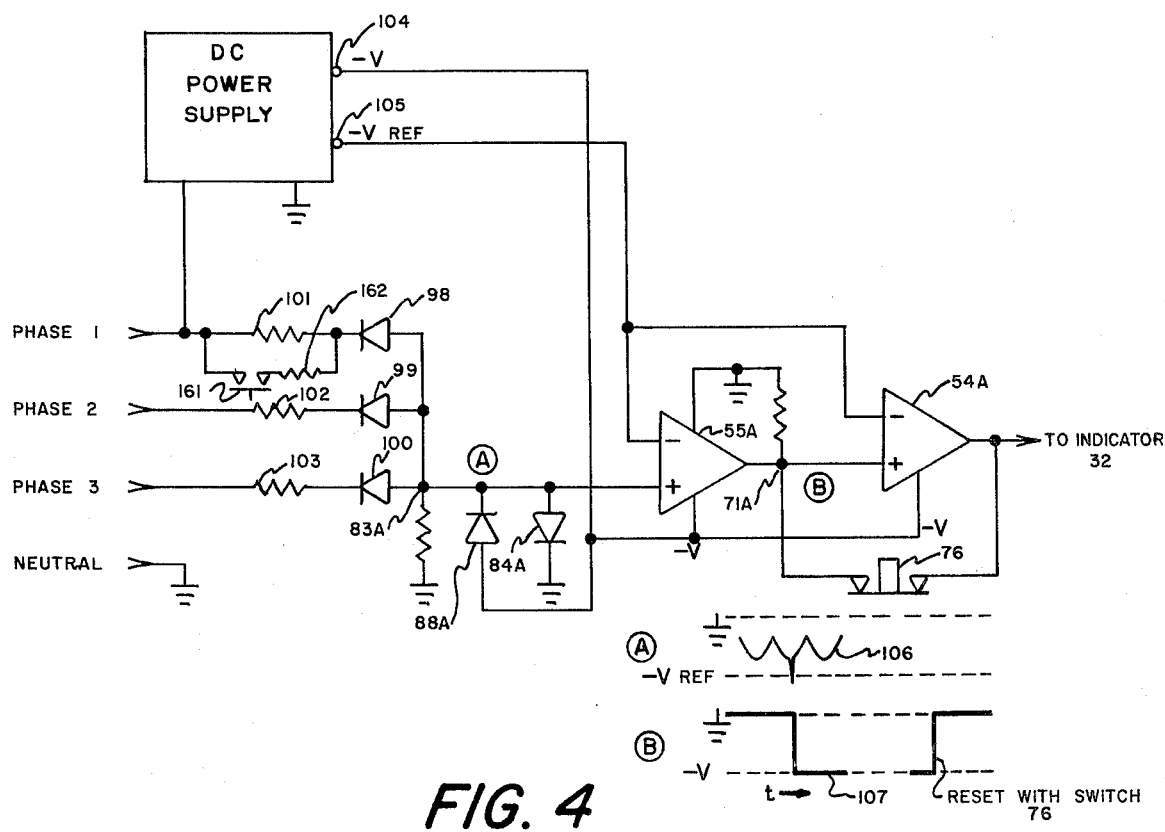
FIG. 4 is similar to FIG. 3, but illustrates a substitute transient detector circuit which operates on the negative side of the voltage cycle and hence may be referred to as a negative transient detector.

The same effect can be had in detecting negative transients from the negative wave forms utilizing the negative transient detection circuit in FIG. 4. In such event, the diodes 98, 99 and 100 in FIG. 4, corresponding to diodes 80, 80A and 80B in FIG. 3 would simply be reversed in polarity as to their insertion in series with the circuit resistors 101, 102 and 103 that correspond to resistor 79, 79A and 79B in FIG. 3.

The power supply voltages thus will be of negative polarity at terminals 104 and 105, the reference potential at 105 being minus 6 volts for example and the voltage at 104 being minus 12 volts. In other aspects the circuit remains the same, e.g., comparators 54A and 55A correspond to the comparators 54 and 55 in FIG. 3, etc., excepting for reverse polarity as to comparator 55A. Note that comparator 54A is not reversed relative to the FIG. 3 structure of the second comparator.

Diodes 84A and 88A are reversed in polarity relative to their counterparts 84 and 88 in FIG. 3, this owing to the reversal in polarity of power supply terminals at voltage terminals 104 and 105. Considering the wave form shown relative to FIG. 4, the wave form at junction 71A in FIG. 4 will be the same as at 94 in FIG. 3 excepting for the fact that the reference potential at its uppermost point is at ground potential with the wave form descending to a minus voltage figure as indicated.

The wave form at junction 83A will appear as seen at 106. The wave form at 107 will appear at junction 71A.

A third type of transient detection circuit is shown in FIG. 5, wherein positive transients on the positive half of the input wave forms and also negative transients on the negative side of the input line voltage are detected, such detection being essentially in a similar manner as described in connection with FIGS. 3 and 4. Since some further explanation may be needed reference is now made to the FIG. 5 schematic wherein the power supply 108, corresponding by way of example to power supply 19 in FIG. 3, is this time provided with four output terminals, 109–112. The first two comprising the positive voltage and positive reference voltages, i.e., plus twelve volts and plus six volts, respectively, and the latter two terminals (111 and 112) comprising the negative reference and negative voltages, e.g., minus 6 volts and minus 12 volts, respectively.

For convenience of illustration the voltage references given at the power supply also appear at comparators 113 and 114, diodes 115 and 116, and comparator 117. Because the circuit in FIG. 5 is bipolar, diodes 80, 80A and 80B in FIG. 3 are not needed and hence are deleted relative to the parallel circuits comprising resistors 118–120. A common voltage divider load resistor 121, of course, will still be included, the same connecting to junction 122 which leads to input terminal 123 of comparator 114. Junction 122 is also coupled directly to input terminal 124 of comparator 113. Resistor 125 is a load resistor between terminal 126 connected to terminal 109 of the power supply (+V) and terminal 127 of comparator 117. Lead 128 is routed to the detector indicated as hereinafter described. Element 129 comprises a spring-loaded, normally closed, push button switch which with its leads 130 and 131 shunts across comparator 117 so as to lock the circuit in a condition as explained heretofore in connection with comparator 54 in FIG. 3. Wave form 132 will appear at junction 122, and wave form 132A will appear at the same terminal 122 at a different point in time.

Likewise, at junction 133 the wave form 134 will appear at times when positive transients occur. Note that the circuit reset is also indicated. At the same junction (133) the wave form at 135 will appear at different times when negative transients occur. The wave form 134 is a result of the detection of the positive half of the input wave form with its positive transient. The voltage drops from +V to −V and then is re-set back to +V by the opening and subsequent closure of push button switch 129. Correspondingly, at a later point in time wherein a negative wave form appears as at 132A, the same drop in voltage from +V to −V will occur at wave form 135 and the voltage will again rise after the comparator has been locked and then subsequently unlocked due to the opening of switch 129 so that the voltage at junction 133 at which time the voltage rises from −V to +V as shown to the right of this drawing. Diodes 115 and 116 correspond to the protection diodes 84 and 88 in FIG. 3 and serve the same function as heretofore described.

Comparator 113 of course is employed to detect positive transients on the wave forms or wave form halves coming through the circuit, whereas comparator 114 senses negative transients occurring on the negative halve of the wave form.

It is noted that the input circuits are ORed together by the series connection with resistor 121 by the parallel connection of resistors 118, 119 and 120 to junction 122 so that transients appearing on any one of the three lines will be detected in the manner described and as to both comparators 113 and 114.

It is also noted that the output of the comparators 113 and 114 are ORed together at junction 136 and the output wave form at this point compared to ground at comparator 117 so that the final wave form at 128 will be in a condition to be received by the appropriate indicator circuit.

Relating to FIGS. 6A–6D, the same represent a few of the several forms that indicator circuit 32 in FIG. 1 may take. Accordingly, the indicator may comprise a light emitting diode, LED, as shown at 137 in FIG. 6A. In most instances, a current limiting resistor 138 will be employed in series with the LED, It is noted that terminal 139 will be coupled to the most positive voltage present, i.e., +12 volts in the case of a positive detection or bi-polar detector and to ground in the case of a negative detector.

FIG. 6B illustrates a comparator circuit used as an inverter wherein comparator 140 is employed, this in conjunction with resistors 141 and 142 and LED 143. Leads 144, 145 and 146 are employed as indicated to complete the circuit. The incoming signal here is simply inverted so that the LED is normally illuminated in which case the LED turns off when a transient is detected. In the case of FIG. 6A, the LED turns on when the transient is detected.

FIG. 6C illustrates that the output of the detector circuit may be connected to some type of audio alarm or horn as at 147 which may include a current limiting resistor 148 that is connected to the most positive voltage terminal at 149, supra. Accordingly, in the circuit at 6C the audio alarm will sound upon a transient being detected.

FIG. 6D employs a comparator 150 in conjunction with resistors 151 and 152, resistor 153 and 154 and also with capacitor/resistor combination 155 and 156, all connected together as shown in FIG. 6D. To the most positive voltage terminal 157 there is coupled a resistor 158 leading to junction 159. A light emitting diode or LED is connected at 160 between terminal 157 and resistor 158; resistor 158 is again a current limiting resistor to protect the diode.

The circuit in FIG. 6D operates so as to provide a flashing indication at the LED 160. This is because of the r-c circuit combination of capacitor 155 and resistor 156 and the time constant determined by way of charge and discharge relative to the values of resistor 156 and capacitor 155. The major effect as to charging in the charging path is contributed by the combination of resistors 158, 151 and 156. Resistors 152 and 153 will have slight effect.

In any event, the result is that the wave form from the detection circuit, of whatever form, will be fed by lead 33 in FIG. 1 to the indicator as for example at FIG. 6A–6D. Other types or audio or visual indicators can be employed.

Optionally, but preferably included in the transient detector circuits of FIGS. 3, 4 and 5 is a normally open spring-biased push button switch 161 which, in series with resistor 162, shunts resistor 79 in FIG. 3, resistor 101 in FIG. 4, and resistor 118 in FIG. 5.

The inclusion of resitor 162 in effective parallel with resistor 79 is to reduce the effective impedance of the voltage divider network including resistor 81. Thus, when the push button 161 is depressed, a transient is simulated at junction 83 which activates all circuits and indicators verifying that they are operative. Accordingly, in checking out the system, one will depress the push button to ensure that the remainder of the circuit such as comparitors 55 and 54 and their components and attached indicators are working properly.

What is provided therefore is a unique system, whatever form such system may take, wherein pronounced or noise type transients accompanying a sinusoidal wave form, can be detected and dissipated so that the efficiency of the load, whatever ultimate load is employed, can be increased, and so that machinery, lighting equipment and so on can be protected in their operative functions and the user can be assured of the systems proper operation.

It is to be noted that if the suppression circuit is suppressing and dissipating transients within the system, and is operating correctly and performing its intended function, then the detection circuit will never "see" such transients and therefore will not indicate the presence of the same. If, however, the suppression circuit fails to suppress transients present for whatever reason, then the detection circuit will so detect such and will note the same to the observer.

It should be noted that contained within the system itself are protective components and features which protect the system from excessively high transients, and which therefore extend the life of the system.

It should be noted that herein the term "ground" refers to a common reference voltage which may or may not be electrical ground, but in fact could be one terminal of a power system that is floating with respect to electrical ground.

The user therefore in an operational situation can know positively that his equipment is being protected and is operating free of transient interference.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. An on-line dynamically operating transient suppression and detection system including, in combination, a pair of input terminals constructed for coupling to a desired load and also to a power distribution circuit; means coupled to said input terminals for suppressing and dissipating transient energies appearing across said input terminals; means coupled to said input terminals for automatically detecting possible transient presence thereat should said suppressing and dissipating means fail to operate; and means coupled to said detecting means for indicating the operationally effective status of said transient suppressing and dissipating means as reflected in said detecting means.

2. The combination of claim 1 wherein said suppressing and dissipating means comprises a varistor.

3. The combination of claim 1 wherein said suppressing and dissipating means comprises a varistor and also a capacitor coupled in shunt relationship across said varistor.

4. The combination of claim 1 wherein said detecting means comprises a pair of series-coupled comparators, and normally-closed manually-operable reset switch means shunted across a respective one of said comparators.

5. The combination of claim 1 wherein said detecting means includes a voltage divider input circuit having manually-operable switch means for selectively shorting across a portion of said voltage divider circuit whereby to simulate transient presence, whereby to serve to check out the operational effectiveness of said detecting means.

6. The combination of claim 2 wherein said varistor includes a series-coupled direct-current-passing impedance.

7. The combination of claim 3 wherein said suppressing and dissipating means also includes a series circuit coupled in parallel across said varistor, said series circuit comprising a normally-open manually-operable switch and a series-connected light-indicator.

8. The combination of claim 4 wherein one of said comparators includes circuit means for constituting said one comparator a memory device, whereby to indicate that a transient has been detected at said input terminals.

9. The combination of claim 4 wherein one of said comparators includes a voltage-divider circuit as an input.

10. An on-line dynamically operating transient suppression and detection system with operational indicator means, said system including, in combination: a transient suppression circuit having a pair of electrical input terminals constructed also for coupling to a desired load, one of said input terminals being constructed for coupling to an input alternating-current line-voltage lead, the remainder of said input terminals being maintained at a common reference potential relative to said one input terminal; electrical circuit means coupled to said one input terminal, and including means for inducing simulated transients, for detecting automatically, transient voltage excursions, from a nominal sinusoidal line-voltage waveform to be impressed across said input terminals, only when said transient supression circuit fails to operate or when said detecting means is being tested by simulated induced transients as produced by said inducing simulated transient means; electrical circuit means for indicating the presence of transients in said electrical circuit detecting means; and a direct-current power supply for supplying direct-current voltages to said electrical circuit detecting means and also to said electrical circuit indicating means, being coupled thereto.

11. The combination of claim 10 wherein said transient suppression circuit comprises first means for filtering out high-frequency noise; second means, shunted across said first means, for shorting-out high voltage transients above a predetermined voltage threshhold; and a series circuit also shunted across said first means and comprising a normally-open manually-operable switch and, series-coupled thereto, and an indicator light.

12. The combination of claim 11 wherein a current-limiting resistor is disposed in series with said indicator light.

13. The combination of claim 11 wherein said indicating means comprising means for giving an audible indication signifying transient presence.

14. The combination of claim 11 wherein said electrical circuit indicating means includes means for presenting a visual indication as to transient presence.

* * * * *